April 17, 1962
D. R. KIRK ETAL
3,029,910
COMPOSITE STRUCTURAL UNIT
Filed Nov. 7, 1958
2 Sheets-Sheet 1
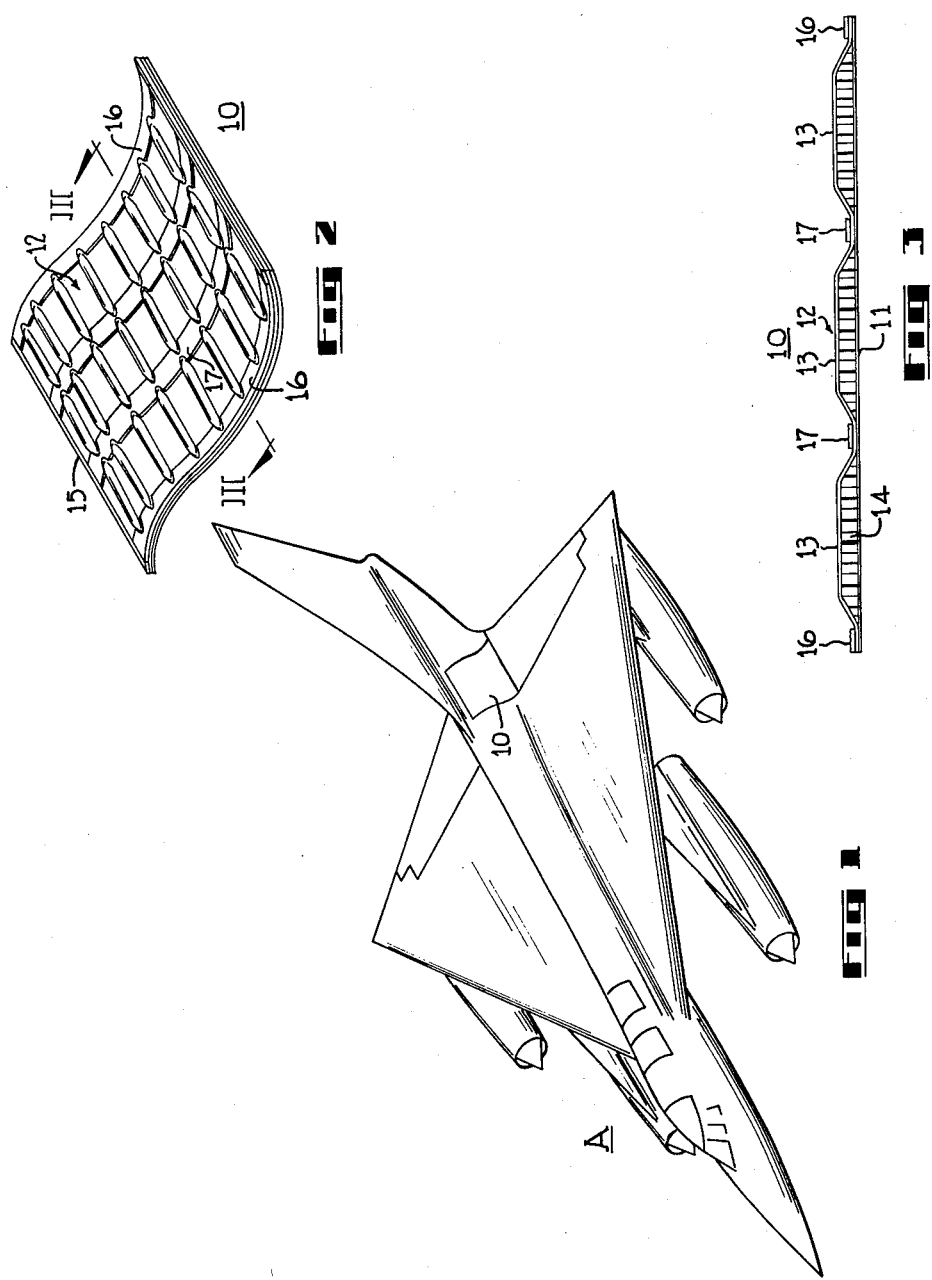
INVENTORS
DONALD R. KIRK
JOHN M. WARREN
BY
ATTORNEY

United States Patent Office 3,029,910
Patented Apr. 17, 1962

3,029,910
COMPOSITE STRUCTURAL UNIT
Donald R. Kirk, Fort Worth, and John M. Warren, Weatherford, Tex., assignors to General Dynamics Corporation, San Diego, Calif., a corporation of Delaware
Filed Nov. 7, 1958, Ser. No. 772,589
2 Claims. (Cl. 189—34)

The present invention relates generally to structural components and more particularly to structural components of the class which are particularly adapted for use on high performance aircraft, missiles and space-craft.

One of the major desiderata facing aircraft and missile designers today is the evolvement of structural components which will satisfactorily withstand the severe stress and thermal loads imposed upon them by the speeds and altitudes demanded in current and projected designs of aircraft, space-craft and missiles. Another important desideratum in the design of such vehicles is the provision of an adequate amount of internal space to accommodate the large amount of accessory equipment necessary for the proper performance of such vehicles.

Because of the requirement of high speed, it has been found necessary to streamline the basic configuration of aircraft, which, in general, results in a decrease in the space available for internal equipment. This fact, together with the fact that aircraft today require substantially more auxiliary equipment than ever before, places a definite premium upon the available, internal space within an aircraft or the like.

Another important factor in the design of a modern aircraft is the altitude at which it will operate. As a result of increased altitude performance, it has become necessary to internally pressurize virtually the whole of the aircraft. This internal pressurization, together with a decrease in external pressure, imposes upon aircraft structural components a pressure differential of substantial magnitude, which tends to buckle such components outwardly.

Further mandatory factors which must be taken into account are exceptional aerodynamic smoothness of the outer structure, heat resistant qualities and fatigue resistant characteristics to both aerodynamic vibrations and high energy sound, such as that generated by jet engines.

Heretofore aircraft structures of similar function have generally consisted of a sheet of relatively heavy gauge metal formed to a desired contour to which was riveted, parallel to the longitudinal axis of the aircraft, a plurality of stiffeners or stringers, usually of Z-shaped cross-section, which served to stiffen the metal sheet. Such sheet was then riveted to closely spaced internal frames and bulkheads which defined the contour or envelope of the airframe.

Several disadvantages are inherent in such structural arrangement. The use of stiffeners, which are riveted to the metal sheet or skin, decreases the fatigue qualities of the structure, as well as increasing the pressurization problems. Another outstanding disadvantage is that such design makes it necessary to position the internal frames in close proximity to each other, thereby reducing the amount of usable, internal space. A further disadvantage is that a substantially greater portion of the aerodynamic loads must be carried by the internal structure.

As a result of the increased performance characteristics of today's aircraft, taken in conjunction with the above inherent deficiencies of previous aircraft structures, it has become necessary to evolve a novel structural component which is particularly adapted to withstand the aerodynamic stress and thermal loads imposed thereon by conditions of supersonic flight, and one which will provide a means for increasing the amount of available, internal space within aircraft of a given size.

It is therefore an object of the present invention to provide a novel structural component which has a high strength/weight ratio.

Another object of the invention is to provide a structural component which is particularly resistant to fatigue resulting from mechanical vibrations and from the effects of high energy sound.

A further object resides in the provision of a structural component which will withstand high, normal pressures and elevated temperatures without buckling.

Yet another object of this invention is to provide a structural component having substantial structural integrity, which is of simple construction and economical to produce.

A still further object is the provision of a structural component which is easily installed, removed, or replaced.

These and other objects and advantages will be apparent to those skilled in the art from the following description and appended drawings wherein:

FIGURE 1 is a perspective view of a jet airplane on which there has been outlined an aft fuselage panel which is typical of a structural component constructed in accordance with the present invention.

FIGURE 2 is a view of the aft fuselage panel removed from the airplane, enlarged and rotated to show the appearance of the inner face of the panel.

FIGURE 3 is a sectional view of the fuselage panel taken along line III—III in FIGURE 2.

Figure 4:
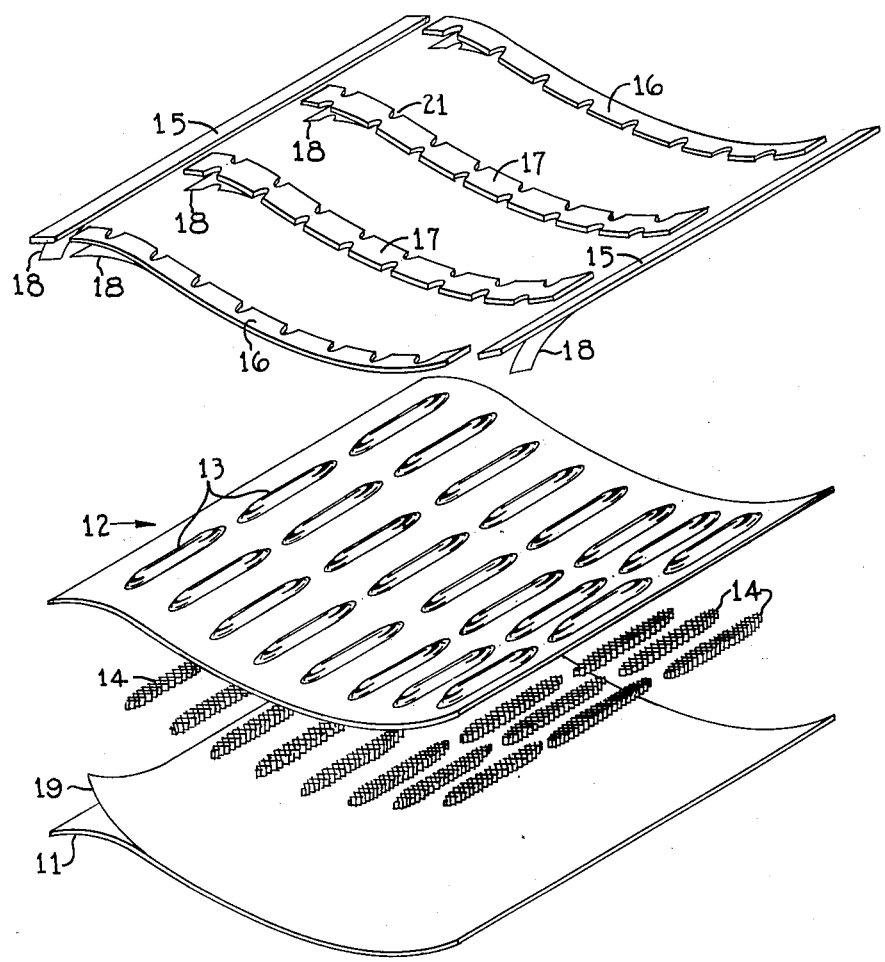
FIGURE 4 is an exploded view of the panel showing its component parts in detail.

Referring now in detail to the drawings, FIGURE 1 shows in perspective, a modern jet bomber A. The fuselage skin of this aircraft A comprises structural components or panels formed in accordance with and embodying the characteristics of the present invention. One such fuselage panel, designated by the numeral 10, has been selected to illustrate the present invention. The fuselage panel 10 was chosen because its complete reversal of contour attests to the configurational versatility of this invention.

In FIGURE 2 panel 10 has been removed from the bomber A, rotated clockwise approximately ninety degrees and enlarged to show clearly the beaded or ribbed appearance of the inner side of panel 10.

In FIGURES 3 and 4 panel 10 is shown in a cross-sectional view and in an exploded view. From these views it is seen that panel 10 comprises a combination of an outer skin 11, an inner skin 12 provided with a plurality of indentations 13 in the form of oblong, hollow beads or ribs, a plurality of suitably shaped cellular core modules 14 receivable within the concavities of the beads 13, longitudinal edge members 15, transverse edge members 16, and intermediate transverse members 17, all of which are adhesively bonded together by means of layers of thermosetting adhesive materials 18 and 19 to form an integral, composite structure.

Outer skin 11 is made of a suitable relatively thin gauge metal and formed in the desired outline configuration and contour. A satisfactory metal is a high strength, high temperature resistant aluminum alloy, which may be in the order of .012 to .064 inch in thickness. Outer skin 11 is employed to provide an aerodynamically smooth surface for the panel.

Inner skin 12 is of the same size and configuration as outer skin 11 and is also made of relatively thin gauge metal and has suitably formed therein, as by stamping, the plurality of oblong beads 13 substantially regularly spaced apart and arranged in rows aligned longitudinally and transversely. Beads 13, as shown, project above the exterior surface of inner skin 12 and the formation of these beads results in a plurality of elongated concavities which open at the interior surface of inner skin 12. Beads 13 serve to stiffen the panel 10 and prevent buckling thereof when the panel 10 is subjected to a large pressure differential. The number of beads employed and the height thereof is dependent upon the load to which the panel will probably be subjected to in use and is readily determined by usual aircraft testing and manufacturing techniques. Within the concavities of beads 13 are disposed sections or modules of cellular core material 14 cut into required conforming shapes to substantially fill the concavities. Core elements 14 are formed of any suitable, commercially available, low density, cellular type material, such as resin impregnated fiber glass, having individual cells which are hexagonal or square in cross-section and which generally resemble natural cells of a honeycomb. Core modules 14 serve to further stiffen the panel 10 and to prevent wrinkling about beads 13 should the panel 10 be subjected to large shear loads. Cores 14 also function to prevent the outer skin 11 from deflecting into beads 13 during the manufacture of panel 10. Outer skin 11 is adhered to inner skin 12, with the core modules 14 therebetween, by means of the bonding material 19.

Doublers 15 and 16, as shown, are in strip-like form and are made of a high strength, high temperature aluminum alloy or other suitable metal. These doublers are fitted along the periphery of and bonded to the exterior face of inner skin 12 by means of strips of bonding material 18 and serve to reinforce the panel 10 at attach points. Intermediate strip-like doublers 17 which extend between the rows of beads 13 are also bonded to inner skin 12 by strips of bonding material 18 and function to reinforce the panel 10 in the areas between beads 13. In order to give a greater load distribution in transverse doublers 16 and intermediate doublers 17, these doublers are fabricated with semi-circular notches or cutouts 21 at their longitudinal edges which permit material of the doublers to extend beyond the ends of beads 13.

The bonding material employed to combine the various components of the unit 10 may be any suitable, commercially available, heat and/or pressure sensitive adhesive, such as, for example, an epoxy-phenolic resin adhesive. The particular adhesive composition used, it is noted, does not form a part of this invention.

It is understood that though a contoured panel 10 is illustrated the present invention is applicable to flat panels and, accordingly, outer skin 11 and inner skin 12 and the various doublers will be of such size, outline, and curvature or flatness, as is necessary to provide a unit 10 which will fit its intended location in the airplane.

As thus described the present invention constitutes a novel structural component comprising a combination of a smooth, outer skin, an inner skin formed with beads to give the structure a high degree of rigidity, a core material within said beads to further increase the structure's rigidity, and various strengthening edge members and doublers, all of which are bonded together by a suitable bonding material to form a composite structure which has a high structural efficiency, which will satisfactorily withstand high temperatures and pressures, which has good fatigue characteristics, and which requires less supporting structure than previous structural components.

While the preferred embodiment of the invention has been described it is to be understood that the invention is not limited thereto, as many variations will be apparent to those skilled in the art; and the invention is to be given its broadest possible interpretation within the terms of the following claims.

What we claim is:

1. A light-weight, high-strength, metallic aircraft panel unit comprising a smooth, outer skin-forming sheet member made of relatively thin sheet metal, an inner sheet member made of relatively thin metal located in face-to-face opposition to said first-mentioned sheet member and adhesively bonded thereto, said inner sheet member being provided with a plurality of oblong hollow bead formations projecting above the exterior face thereof and opening to its interior face, a plurality of cellular core elements located between said two sheet members and each being disposed within a hollow bead formation, each said cellular core element having a shape conforming substantially to the interior shape of the hollow bead formation receiving it, and a plurality of flat reinforcing members adhesively bonded to the exterior face of said inner sheet member, with certain of said reinforcing members being located adjacent the peripheral edges of said inner sheet member and having notched edges accommodating the ends of said hollow bead formations.

2. A light-weight, high-strength, metallic aircraft panel unit comprising a smooth, outer skin-forming sheet member made of relatively thin sheet metal, an inner sheet member made of relatively thin metal located in face-to-face opposition to said first-mentioned sheet member and adhesively bonded thereto, said inner sheet member being provided with a plurality of oblong hollow bead formations projecting above the exterior face thereof and opening to its interior face, said bead formations being arranged in a plurality of rows, a plurality of cellular core elements located between said two sheet members and each being disposed within a hollow bead formation, each said cellular core element having a shape conforming substantially to the interior shape of the hollow bead formation receiving it, and a plurality of flat reinforcing members adhesively bonded to the exterior face of said inner sheet member, said plurality of flat reinforcing members including edge reinforcing members located adjacent the peripheral edges of said inner sheet member and including reinforcing members extending between said rows of bead formations, various of said flat reinforcing members having notched edges for fitting said members about the ends of said beads.

References Cited in the file of this patent

UNITED STATES PATENTS

| | | |
|---|---|---|
| 1,605,513 | Connery | Nov. 2, 1926 |
| 2,234,517 | Coffman | Mar. 11, 1941 |
| 2,786,435 | Ellzey | Mar. 26, 1957 |
| 2,836,267 | Reinhold | May 27, 1958 |

FOREIGN PATENTS

| | | |
|---|---|---|
| 776,649 | France | Nov. 8, 1934 |